United States Patent
Sitter et al.

[11] Patent Number: 6,047,957
[45] Date of Patent: Apr. 11, 2000

[54] VIBRATION DAMPING PIVOT BUSHING

[75] Inventors: Don H. Sitter, Montgomery, Ala.; Dale P. Gilson, Bellflower, Calif.

[73] Assignee: Dana Corporation, Toledo, Ohio

[21] Appl. No.: 08/760,683

[22] Filed: Dec. 4, 1996

[51] Int. Cl.[7] .................................................. F16F 1/44
[52] U.S. Cl. ........................................ 267/293; 267/281
[58] Field of Search ................................. 248/566, 603, 248/609; 267/140.12, 140.2, 141.2–141.5, 270, 276, 277, 279–282, 292, 293; 180/300, 312; 403/225–228

[56] References Cited

U.S. PATENT DOCUMENTS

| | | | |
|---|---|---|---|
| 1,541,277 | 6/1925 | Powell | 267/270 |
| 1,959,256 | 5/1934 | Zerk | 267/270 |
| 2,043,015 | 6/1936 | Shutts | 267/270 |
| 2,048,256 | 7/1936 | Geyer | 403/228 |
| 2,958,526 | 11/1960 | Ulderup | 267/292 |
| 3,572,677 | 3/1971 | Damon | 267/281 |
| 4,157,227 | 6/1979 | Hahle | 403/228 |
| 4,634,108 | 1/1987 | Munch | 267/279 |
| 4,899,997 | 2/1990 | Thorn | 267/141.2 |
| 5,172,894 | 12/1992 | Hein | 267/140.12 |
| 5,413,374 | 5/1995 | Pierce | 403/225 |
| 5,516,083 | 5/1996 | Sprang et al. | 267/140.12 |

*Primary Examiner*—Chris Schwartz
*Attorney, Agent, or Firm*—Oldham & Oldham Co., L.P.A.

[57] ABSTRACT

A bushing for a vehicle suspension system has a hollow cylindrical sleeve and a hollow cylindrical jacket, with first and second elastomeric members compressively preloaded into an annular space between the sleeve and the jacket. The elastomeric members, which are complementary in filling the annular space, are selected from different materials possessing different spring rates. The elastomeric members are preferably semicircular radial sections of an annulus. When the bushing is aligned in the vehicle suspension, the bushing exhibits at least one diameter where the bushing effectively has a first spring rate when the bushing is acted on by a force in a first radial direction and exhibits a different spring rate when the bushing is acted upon by a force in a second radial direction which is one hundred eighty degrees opposed to the first radial direction.

11 Claims, 2 Drawing Sheets

VIBRATION DAMPING PIVOT BUSHING

The present invention relates to a pivot bushing for a vehicle suspension, particularly an air-ride suspension for a trailer. More particularly, the present invention relates to a cylindrical bushing intended to dampen oscillations in at least one plane, especially in the fore-aft direction.

BACKGROUND OF THE ART

In a vehicle, particularly a trailer, the axles are attached to the body of the vehicle through a suspension system. In many trailers, the axles are paired in a tandem axle pair, with the forward and rear axles of the pair attached to a suspension of a type generally known as a trailing arm suspension. Such a suspension system provides two beams for each axle, with one or more axles being provided for the front and the rear of the vehicle. The forward and rear axle beam pairs are attached to pendant brackets from a steel frame superstructure of the vehicle. This connection between the beams and the bracket is made through a bushing, an improvement of which is the subject of the present invention. Each of the beam pairs is likewise attached to the respective axle at the trailing ends of the beams by a pair of welds near the ends of the axle. These welds may be generally characterized as longitudinal welds of the side surfaces of the axle to a saddle piece which is attached to the beam. In some of these suspensions, at least one resilient pneumatic chamber is provided between the beam and the vehicle frame to take up some of the articulation forces and load of the vehicle. These suspensions are generally referred to as "air-ride" suspensions.

As the vehicle moves, the axle is subjected to a variety of forces, but these forces may be generally resolved into three distinct component forces. First, there is a component which acts from side to side on the vehicle, that is, in an axial direction with reference to the axle. The second force is an "up-down", or vertical, radial deflection or oscillation of the axle. The third force is a "fore-aft", or horizontal, radial deflection or oscillation of the axle. Each of these forces acts upon the welds which secure the axle in a non-rotative fashion to the beam. Various means have been devised to protect the weld from the component forces, but premature failure of welds is still considered a problem. It is believed that protection of the weld from the "fore-aft" oscillations will go a long way in prolonging weld life.

Forces acting on the axle may be transmitted through the beam pair to the bracket and ultimately to the frame if not attenuated or damped. In mounting the axle to the frame in a resilient manner to absorb oscillations received by the axle during motion, it is known to use a resilient bushing to isolate metal-to-metal connections at the beam-bracket juncture which would transmit the oscillations. In fact, some bushings of the prior art have been sophisticated enough to provide a radially varying stiffness by providing longitudinal cavities in a resilient member in the bushing. However, it is also known that a resilient bushing by itself does not always resolve the problem, since the pivotal motion permitted by such a bushing may establish a resonance which may be just as damaging as the initial oscillation. Although the prior art teaches radial variance in stiffness of the bushing, it does not teach the spring rate variance in opposing directions of a diameter of the bushing.

SUMMARY OF THE INVENTION

It is, therefore, an object of the present invention to provide a resilient bushing with a first spring rate in a first radial direction and a second spring rate in a second radial direction offset one hundred eighty degrees from the first radial direction with internal resilient members having different spring rates. Such a resilient bushing comprises: a hollow cylindrical sleeve with an inner diameter and an outer diameter, a hollow cylindrical jacket with an inner diameter larger than the outer diameter of the sleeve, and a first and a second elastomeric member, said elastomeric members shaped in a complementary manner and compressively preloaded to fill an annular space between the sleeve and the jacket, wherein the first and second elastomeric members each different spring rates for absorbing resonant frequencies.

BRIEF DESCRIPTION OF THE DRAWINGS

Better understanding of the present invention will be had when reference is made to the accompanying drawings, in which identical parts are identified with identical reference numerals.

DETAILED DESCRIPTION OF THE DRAWINGS

Figure 1:
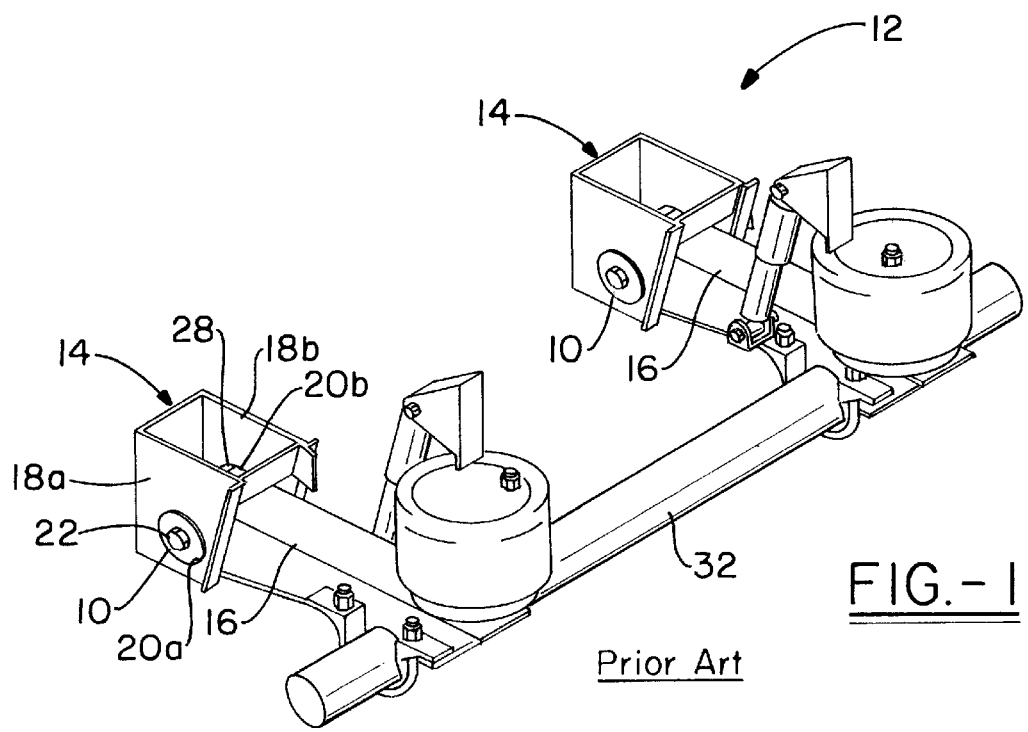
FIG. 1 is a perspective view a vehicle suspension system as known in the prior art with a bushing as known in the prior art seen in end view.

A bushing 10 of the type known in the prior art is shown in operation on a vehicle suspension system 12 in FIG. 1. The vehicle frame has a frame hanger 14 permanently affixed to and pending from it, and the frame hanger for a given beam 16 typically provides a pair of spaced apart plates 18a, 18b each having a vertically aligned aperture 20a, 20b, through which a bolt 22 may be secured. The bushing 10 has an inner cylindrical sleeve 24 through which the bolt 22 is passed and an outer cylindrical jacket 26 which is passed through-an eye 28 at a first or leading end of the beam 16. The bushing 10 has an annular space located between the sleeve 24 and the jacket 26, and the annular space is filled with a resilient material, preferably under some preloaded compression. "Up-down" oscillations of axle 32 affixed to beam 16 at its second or trailing end are translated through the beam to the first end and these motions will pass through the beam-hanger junction into the frame unless attenuated. Since bushing 10 has the resilient filling, the bushing is generally able to absorb the "up-down" oscillation. Similarly, a "fore-aft" oscillation of the axle 32, typically caused by braking or acceleration, passes through the beam 16 from the second end to the first end, where the resilient material in bushing 10 is able to absorb the oscillation. When longitudinal cavities in the resilient material are used to modify directional stiffness, the resilient material still possesses a distinctive spring rate as an inherent property of the material. When the oscillation, either "up-down" or "fore-aft", is of the proper frequency, the oscillation acting on the resilient material will cause a low-frequency resonance in the resilient material and the bushing will be rendered ineffective. The resonant frequency is due to factors beyond spring rate of the resilient material, such as suspension geometry and ground input excitation frequency. However, these factors might be much more difficult to manipulate in a practical manner than spring rate.

Figure 2:
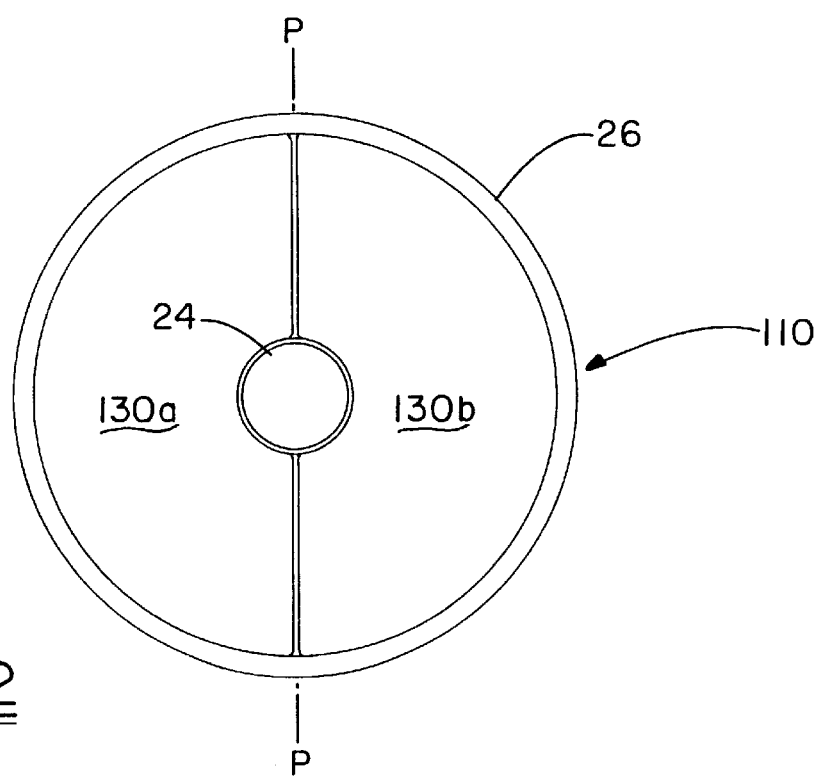
FIG. 2 is an end view of a bushing of the present invention.
Figure 3:
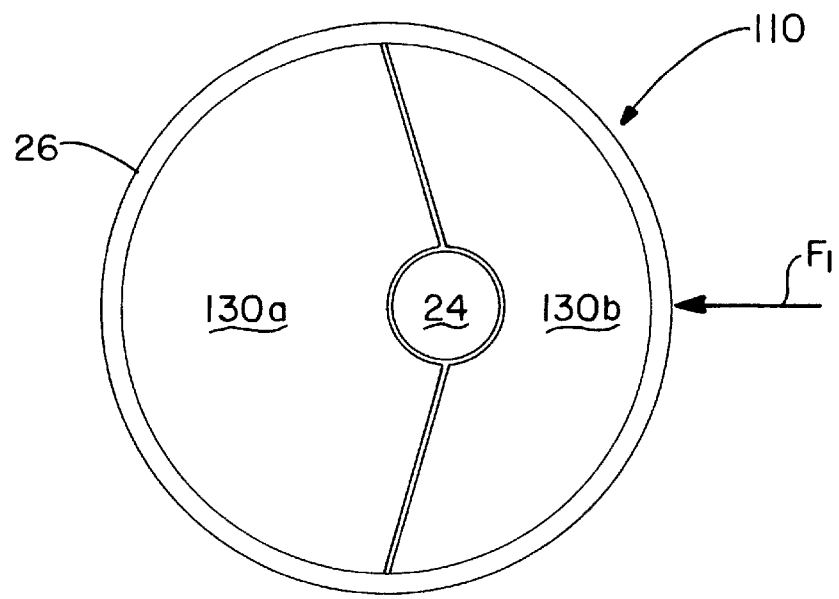
FIG. 3 is an end view of the bushing of the present invention in elastic compression and restoration from a force acting on it in a first radial direction.
Figure 4:
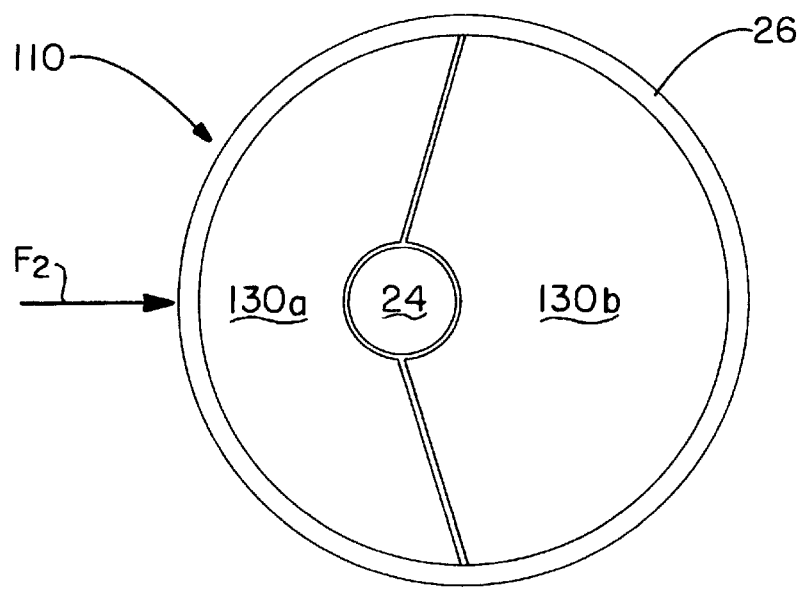
FIG. 4 is an end view of the bushing of the present invention in elastic compression and restoration from a force acting on it in an opposing second radial direction.

The present invention bushing 110 is now shown in isolated end elevation view in FIG. 2. As with prior art bushing 10, inner cylindrical sleeve 24 and outer cylindrical jacket 26 are maintained in a generally consistent spaced apart coaxial relationship by the interposition of resilient material under a compressive preload, but instead of a single piece of resilient material with longitudinal cavities or even multiple pieces of the same material, a pair of essentially semicircular radial sections 130*a*, 130*b* of an annulus are provided. In the preferred embodiment as shown, the sections 130*a* and 130*b* are structurally quite similar, being essentially complementary halves of a resilient bushing which would fill the annular space between the sleeve and jacket, but the sections are carefully selected to be of different spring rates. As is explained below, the resilient sections 130*a*, 130*b* are inserted into the bushing, but they are not adhered or bonded to the sleeve 24 or the jacket 26. For this reason, the sections 130 are subject to being compressed by external forces acting on sleeve 24 and jacket 26 and the sections may absorb energy by such compression, but the sections will restore freely. In other words, the sections 130 can "push" but not "pull" the sleeve 24 or jacket 26. Accordingly, when the sections 130*a*, 130*b* are aligned so that the plane of their juncture P is vertical as shown in FIG. 2 and a radial force F1 acts on the bushing 110 from the right side as shown in FIG. 3, the right side of jacket 26 will be pushed toward sleeve 24, compressing section 130*b* as sleeve and jacket are temporarily pushed into a non-coaxial position, although the extent of the displacement shown in both FIGS. 3 and 4 is exaggerated for the purpose of illustration. As the force is removed, section 130*b* will restore to its initial shape, with the restoration dictated by the spring rate of section 130*b*. When a force F2 acts on the left side of the bushing 110, as shown in FIG. 4, section 130*a* will be compressed, so that the removal of the force will allow restoration to the left according to the spring rate of section 130*a*. Since the spring rates of 130*a* and 130*b* are different, bushing 110 will restore differently to forces acting on it from the left and right. This will quickly dampen a resonant force acting on the bushing 110 along the radial plane defined by these forces. In this vertical alignment, it will also be understood that the bushing 110 would react symmetrically to up and down forces acting on the bushing, so that the dampening effect would not be observed.

Assembly of the bushing 110 of the present invention may be accomplished in several manners. The preferred manner is to produce a pair of the sections 130 to provide an annulus of material. The sections 130 may be joined to each other longitudinally by a variety of means, including adhesive bonding, mechanical linking, or the like, or they may be co-extruded if the materials permit. The joined sections 130 are chilled to a temperature of about 32° F., and pressed into jacket 26. After the temperature of this subassembly is recovered to a temperature of about 160° F., the sleeve 24 is cold pressed into the subassembly. This method of assembly results in a bushing 110 in which each of the sections 130 is compressively preloaded against the sleeve 24 and jacket 26. Once assembled, the bushing 110 may be pressed into the eye 28 of beam 16 in the same manner as the prior art bushing 10. It will be understood that the installer will be able to align the bushing 110 upon installation so that the angle of plane P may be set at the time of installation.

The further feature affecting tunability of the bushing 110 of the present invention is the selection of materials for sections 130*a* and 130*b*. The first section 130*a* will preferably be selected from a commonly available elastomeric material, such as a synthetic or natural rubber having a spring rate in the range of about 40,000 lb-in. to about 110,000 lb-in. The second section 130*b* would have a significantly different spring rate, and would probably be selected from the class of commercially available polyurethane elastomers. These materials would typically be softer and would exhibit a spring rate in the range of about one-third to about one-fifth the spring rate of the first section. Based on the range of 40,000 to about 110,000 lb-in., the typical spring rate range for the second material would be from about 8,000 to about 36,300 lb-in.

A bushing of the same type as used in the present invention is also found in the spring ends of a spring-type suspension, where an eye at each end of the spring is directly attached to a frame member by a bushing. Since a spring-type suspension has the same purpose as an air-ride suspension, with the main difference being the level of attenuation of external forces, such a bushing as described in the present invention would be useful in association with a spring-type suspension.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A bushing for a vehicle suspension system comprising:
    a hollow cylindrical sleeve with an inner diameter and an outer diameter;
    a hollow cylindrical jacket with an inner diameter larger than the outer diameter of the sleeve; and
    a first and a second elastomeric member, said elastomeric members shaped in a complementary manner and compressively preloaded to fill an annular space between the sleeve and the jacket so that the sleeve and the jacket are substantially coaxial when the bushing is in a substantially unloaded condition;
    wherein the first and second elastomeric members each have a spring rate such that the bushing has a first spring rate when measured in a first radial direction and a second spring rate when measured in a second radial direction offset one hundred eighty degrees from the first radial direction.

2. The bushing of claim 1 wherein the first and the second elastomeric members are radial sections of an annulus.

3. The bushing of claim 2 wherein the first and the second elastomeric members are essentially semicircular radial sections of an annulus.

4. The bushing of claim 1 wherein the spring rates of the respective first and second elastomeric members differ from each other by at least 5%, based on the larger of the two spring rates.

5. The bushing of claim 1 wherein each of the first and second elastomeric members is in frictional contact with both the sleeve and the jacket.

6. The bushing of claim 1 wherein the first elastomeric member is natural rubber.

7. The bushing of claim 1 wherein a ratio of said first spring rate to said second spring rates differs by at least 5% from 1.0.

8. The bushing of claim 1 wherein the bushing has at least one diameter passing through it such that a first compressive radial force acting on the bushing on that diameter is opposed by a first elastomeric spring rate and a second compressive radial force acting on the bushing in a direction one hundred eighty degrees opposite to the first compressive force is opposed by a second elastomeric spring rate, said first and second elastomeric spring rates differing from each other by at least 5%, based upon the larger of the two spring rates.

9. A suspension system for attaching an axle to a vehicle frame, said suspension system comprising a bushing having a hollow cylindrical sleeve and a hollow cylindrical jacket, and a first and a second elastomeric member, the elastomeric members shaped in a complementary manner and compressively preloaded to fill an annular space between the sleeve and the jacket so that the sleeve and the jacket are substantially coaxial when the bushing is substantially unloaded, said suspension system characterized by a first spring rate when measured in a first radial direction and a second spring rate when measured in a second radial direction offset one hundred eighty degrees from the first radial direction, a ratio of the first said spring rate to the second said spring rate differing by at least 5% from 1.0.

10. The suspension system of claim 9 wherein the bushing is positioned such that the first and second radial directions are oriented in a substantially horizontal plane of said vehicle frame as defined by a line joining the longitudinal axis of the bushing and the longitudinal axis of the axle.

11. The bushing according to claim 9 wherein:

the sleeve is located concentric to the jacket; and the bushing has a first radial plane where a force acting along the first radial plane in a first radial direction against the bushing will be opposed by the same spring rate as a force acting along the first radial plane in a second radial direction one hundred eighty degrees from the first radial direction and this first radial plane is positioned normal to a second radial plane where the force acting along the second radial plane in a first radial direction against the bushing will be opposed by a first spring rate and a force acting along the second radial plane in a second radial direction one hundred eighty degrees from the first radial direction will be opposed by a second spring rate different from the first spring rate.

* * * * *